United States Patent [19]

Daszinnies

[11] Patent Number: 4,652,084
[45] Date of Patent: Mar. 24, 1987

[54] PROJECTION SCREENS FOR TWO- OR THREE-DIMENSIONAL FRONT AND BACK PROJECTIONS

[76] Inventor: Jurgen Daszinnies, Erlengrund 1, 2202 Barmstedt, Fed. Rep. of Germany

[21] Appl. No.: 735,645

[22] Filed: May 20, 1985

[30] Foreign Application Priority Data

May 19, 1984 [DE] Fed. Rep. of Germany ....... 3418661

[51] Int. Cl.$^4$ ............................................. G03B 21/56
[52] U.S. Cl. ...................................... 350/117; 350/126
[58] Field of Search ................ 350/117, 126; 428/149, 428/143, 480

[56] References Cited

U.S. PATENT DOCUMENTS

3,598,640 8/1971 Bennett ................................ 428/149
4,116,911 9/1978 Miyahara et al. ............... 350/117 X

FOREIGN PATENT DOCUMENTS

2201467 7/1973 Fed. Rep. of Germany ...... 350/117
1902056 12/1976 Fed. Rep. of Germany .

OTHER PUBLICATIONS

Plexiglas, Prufergebnisse PE 2.4, Rohm GmbH Chemische Fabrik, Oct. 1981, pp. 1–27.
Plexiglas, Rohm GmbH Chemische Fabrik, by Dr. Hans Hettler, 1986/87, pp. 1, 4.
Perspex, Eigenschaften und Bearbeitungsverfahren, (1982), pp. 1–19.

*Primary Examiner*—Richard A. Wintercorn
*Attorney, Agent, or Firm*—Cushman, Darby & Cushman

[57] ABSTRACT

The present invention provides projection screens for two- or three-dimensional front and back projections in the form of panes or sheets of plastics, when required with delustering lamina and is characterized in that a plastics having noticeably directed transmission, a transmission degree of approximately 1 to 98%, a scattering power of less than 0.3 and a luminous density coefficient of $\epsilon_2 = 5°$ of and exceeding 0.5 is used.

11 Claims, No Drawings

PROJECTION SCREENS FOR TWO- OR THREE-DIMENSIONAL FRONT AND BACK PROJECTIONS

The present invention relates to projection screens in the form of panes or sheets for two- or three-dimensional projections.

BACKGROUND OF THE INVENTION

A number of materials have already been used as projection screens for two-dimensional projections, but they are not entirely satisfactory. Coated materials in which a more or less large scattering effect influencing the lateral view characteristic attained by the type of coating is usually preferred for this purpose. The higher the degree of reflection of the projection screen, the lower the lateral view characteristic, and the stronger the undesirable scintillation or vice versa.

In the case of front projections a substantial disadvantage lies in that the viewers must almost exclusively be seated laterally of the picture screen to avoid disturbing the projection beams. An optically darker picture thus cannot be avoided when viewing the pictures. Of course, there exists the possibility of placing the projector above the heads of the viewers. However, this results in a distortion in trapezoidal form of the projected picture unless the picture screen is beveled rearwardly. However, this will again result in an optically darker picture. These disadvantages can be avoided by back projection with substantially brighter pictures. However, difficulties are frequently encountered in this case as well in that because of the structural conditions, the center portion of the projection screen appears brighter than the lateral surfaces (the so-called hot spot) and that as a result of the material, the filaments of the projector often are distinguishable. Furthermore, in many cases an undesired glair effect and a high scintillation are encountered.

For the back projection, plastic panes or rubber-like flexible materials are usually used. Heretofore attempts were made to overcome these disadvantages by special coatings, for example, wax coatings, but these methods were not really successful.

In projection screens for the three-dimensional projections there still exist substantial difficulties at the present time. The material used for this purpose heretofore, namely silver-coated or vapour-deposited linens have the decisive disadvantage of depolarization of incident light and of light passing through in addition to the disadvantages encountered in the screens for two-dimensional projections. Furthermore, the projected pictures are very bright at the center and relatively dark at the edges, and because of the depolarization or rotation of the polarized light, so-called "stereopictures" are frequently obtained.

Therefore, a projection screen having optimal optical properties must equally satisfy the following requirements:
1. high resolving power
2. high degree of transmission,
3. very good light distribution,
4. wide picture reproduction range, i.e., color quality,
5. almost no scintillation,
6. possibility of use in daylight or artificial light and
7. for three-dimensional projections, no depolarization or rotation of the polarized light.

SUMMARY OF THE INVENTION

The present invention provides projection screens which do not have the disadvantages described hereinbefore and have largely optimal properties for two- and three-dimensional front and back projections.

According to the present invention there are provided projection screens for two- or three-dimensional projections in the form of panes or sheets of plastic which are characterized by a noticeably directed transmission of the projection beams, a transmission degree of approximately 1 to 98%, a scattering power of less than 0.3 and a luminous density coefficient of or exceeding 0.5 at $\epsilon_2 = 5°$.

DETAILED DESCRIPTION OF THE INVENTION

The requirements which a projection screen for the two- or three-dimensional back projection must satisfy are almost contradictory in themselves since a high transmission is required in order to obtain a bright picture, on the one hand, but this automatically means a slight scattering effect on the other hand. However, a certain amount of scattering normally is absolutely necessary to obtain a picture as uniform as possible over the entire projection screen. Furthermore, for 3D-projections it is necessary that the plastic used or the coating has an optical activity as low as possible or preferably no optical activity at all so that, for example, depolarization or rotation of the plane of the polarized light can be prevented. Furthermore, it is desirable that, as far as possible, the plastic has no intrinsic coloration so that the color reproduction remains natural. The screen must moreover have no scintillation effect.

As a complete surprise it has been found that specific vitreous plastics which have been dyed with opalizing agents satisfy these requirements in an outstanding manner. Most of these plastics used for the screen are polymethyl methacrylates or their copolymers which are not completely transparent but have been rendered slightly opaque by the addition of opalizing agents or pigments. The plastics must have a noticeably directed transmission degree $\tau$ of approximately 1 to 98%, a scattering power $\sigma$ of less than 0.3, a luminous density coefficient of or exceeding 0.5 at $\epsilon_2 = 5°$. Furthermore, these plastics and the opalization agents or pigments have only a very slight optical activity or none at all, i.e., they thus do not change, for example, the direction of the polarized light or they change it only impercipitibly, and, therefore, are excellently suitable for 3D-projections.

Furthermore, it has been found that for the front projection in two-dimensional projection, plastics having a transmission degree of approximately 1 to 40 or 44% can be used, and for the back projection, plastics having a transmission degree of approximately 45 to 98%. For the back projection particularly, plastics in which the transmission degree is approximately 65 to 98%, the half-angle value is less than 1° and the luminous density coefficient is approximately 1.75 to 2.50 at $\epsilon_2 = 5°$, are used.

The pane can have a lamina thickness of approximately 1 up to and exceeding 30 mm, or a thickness of greater than or equal to 0.01 mm.

Dyed plastic panes or sheets having the properties required according to the present invention are marketed by the firm Rohm under the trademark "Plexiglas Opal", by the firm of Rias under the trademark "Riacryl Opal", and by ICI under the trademark of "Perspex Opal". The various plastics which were used heretofore for completely different purposes satisfy, as projection screens, all the requirements, namely, a uniformly bright picture, natural color reproduction practically without scintillation and in the case of 3D-projections a completely natural picture reproductin without annoying double pictures. When required, plastics whose surface have a high luster in the normal case can be coated with a suitable dulling agent since the salts of the opalizing agents hardly change the special properties of the light beams passing through. The refraction due to the crystalline structure of these salts is exceedingly low and the directed transmission thus is very high with very good lateral view at the same time.

The present invention will be illustrated hereafter in greater detail by means of the following Example.

EXAMPLE

The physical data were measured on a pane having the dimension of $1m \times 2m$ and a thickness of 3 mm. Measuring arrangement and computation followed the data of the test standards and results B 3.2 of the firm of Rohm for Plexiglas.

The projection screen had a transmission degree of 85%, a half-angle value lower than 1 and a luminous density coefficient of 2.350 at $\epsilon_2 = 5°$. When using the projection screen for the three-dimensional back projection uniformly bright pictures were obtained without "hot spots" and without noticeable darkening of the pictures towards the edges and simultaneously a very good lateral view. Color characteristics and color brilliancy were excellent. Double pictures or "streropictures" are not present so that the three-dimensional reproduction is absolutely optimal.

The projection screens produced according to this present invention can be used for the reproduction of slides, films, videos and lasers.

The embodiments of the invention in which an exclusive property or privilege is claimed are defined as follows:

1. A projection screen for two- or three-dimensional front or back projections comprising at least one pane of plastic wherein the said pane has a noticeably directed transmission degree of approximately 1 to 98%, a scattering power of less than 0.3, and a luminous dinsity coefficient of or exceeding approximately 0.5 at $\epsilon_2 = 5°$.

2. A projection screen according to claim 1 wherein said pane has at most a very slight optical activity.

3. A projection screen according to claim 1 for the front projection, wherein said pane has a transmission degree of approximately 1 to 44%.

4. A projection screen according to claim 1 for the back projection, wherein said pane has a transmission degree of approximately 45 to 98%.

5. A projection screen according to claim 1 wherein said pane has a half-angle value of less than 1°.

6. A projection screen according to claim 1, wherein said pane has a lamina thickness of greater than approximately 1 mm.

7. A projection screen according to claim 1 wherein said pane has a lamina thickness of at least approximately 1 mm.

8. A projection screen according to claim 1 wherein said pane comprises a homo or copolymer of methyl methacrylate and an opalizing agent or pigment.

9. A projection screen according to claim 1, wherein said pane has a lamina thickness of 1 to 30 mm.

10. A projection screen according to claim 8, wherein said pane has at most a very slight optical activity, a transmission degree of 1 to 44%, and a half angle of less than 1%.

11. A projection screen according to claim 8, wherein said pane has at most a very slight optical activity, a transmission degree of 45 to 98%, and a half angle of less than 1%.

* * * * *